(12) United States Patent
Ikai et al.

(10) Patent No.: US 10,889,519 B2
(45) Date of Patent: Jan. 12, 2021

(54) METHOD FOR MANUFACTURING GLASS ROLL

(71) Applicant: Nippon Electric Glass Co., Ltd., Shiga (JP)

(72) Inventors: Naohiro Ikai, Shiga (JP); Kaoru Mitsugi, Shiga (JP); Shuji Akiyama, Shiga (JP); Hiroki Mori, Shiga (JP); Koichi Mori, Shiga (JP); Yasuhiro Uemura, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 177 days.

(21) Appl. No.: 16/301,779

(22) PCT Filed: Apr. 21, 2017

(86) PCT No.: PCT/JP2017/016113
§ 371 (c)(1),
(2) Date: Nov. 15, 2018

(87) PCT Pub. No.: WO2017/208676
PCT Pub. Date: Dec. 7, 2017

(65) Prior Publication Data
US 2019/0152826 A1    May 23, 2019

(30) Foreign Application Priority Data
May 31, 2016  (JP) ................. 2016-108676

(51) Int. Cl.
*C03B 33/023*  (2006.01)
*C03B 17/06*  (2006.01)
(Continued)

(52) U.S. Cl.
CPC .......... *C03B 17/06* (2013.01); *B23K 26/0846* (2013.01); *B23K 26/16* (2013.01);
(Continued)

(58) Field of Classification Search
CPC ................................... C03B 33/0235
See application file for complete search history.

(56) References Cited

U.S. PATENT DOCUMENTS 8,312,741 B2 * 11/2012 Teranishi .............. C03B 33/091
65/97
2012/0318024 A1  12/2012 Mori et al.
(Continued)

FOREIGN PATENT DOCUMENTS

| JP | 09-136184 | 5/1997 |
| JP | 2012-240883 | 12/2012 |
| WO | 2014/192482 | 12/2014 |

OTHER PUBLICATIONS

International Preliminary Report on Patentability dated Dec. 4, 2018 in International (PCT) Application No. PCT/JP2017/016113.
(Continued)

*Primary Examiner* — Cynthia Szewczyk
(74) *Attorney, Agent, or Firm* — Wenderoth, Lind & Ponack, L.L.P.

(57) ABSTRACT

Provided is method of producing a glass roll, the method including: a conveying step of conveying a glass film (G) along a longitudinal direction thereof; a cutting step of irradiating the glass film (G) with a laser beam (L) from a laser irradiation apparatus (19) while conveying the glass film (G) by the conveying step, to thereby separate the glass film (G) into a non-product portion (Gc) and a product portion (Gd); and a take-up step of taking up the product portion (Gd) into a roll shape, to thereby form a glass roll (R). The cutting step includes winding a thread-like peeled material (Ge) generated from an end portion of the product portion (Gd) in a width direction around a rod-shaped collecting member (20a), to thereby collect the thread-like peeled material (Ge).

20 Claims, 5 Drawing Sheets

(51) Int. Cl.
　　　*B65H 35/02*　　(2006.01)
　　　*B65H 37/00*　　(2006.01)
　　　*B23K 26/08*　　(2014.01)
　　　*B23K 26/402*　(2014.01)
　　　*B23K 26/38*　　(2014.01)
　　　*B23K 26/16*　　(2006.01)
　　　*B23K 37/02*　　(2006.01)
　　　*C03B 33/08*　　(2006.01)
　　　*B23K 101/16*　(2006.01)
　　　*B23K 103/00*　(2006.01)
(52) U.S. Cl.
　　　CPC ............ *B23K 26/38* (2013.01); *B23K 26/402* (2013.01); *B23K 37/0235* (2013.01); *B65H 35/02* (2013.01); *B65H 37/00* (2013.01); *C03B 33/0235* (2013.01); *C03B 33/082* (2013.01); *B23K 2101/16* (2018.08); *B23K 2103/54* (2018.08); *C03B 2225/02* (2013.01)

(56) References Cited

U.S. PATENT DOCUMENTS

2015/0218034 A1* 8/2015 Bigelow ............ C03B 33/0235
　　　　　　　　　　　　　　　　　　　　　　　　　156/271
2015/0315059 A1* 11/2015 Abramov ............ C03B 23/0235
　　　　　　　　　　　　　　　　　　　　　　　　　65/176

OTHER PUBLICATIONS

Written Opinion of International Searching Authority dated Jun. 6, 2017 in International (PCT) Application No. PCT/JP2017/016113.
International Search Report dated Jun. 6, 2017 in International (PCT) Application No. PCT/JP2017/016113.
Office Action dated Aug. 19, 2020 in corresponding Chinese Patent Application No. 201780015691.4, with English Translation of Search Report.

* cited by examiner

METHOD FOR MANUFACTURING GLASS ROLL

TECHNICAL FIELD

The present invention relates to a method of producing a glass roll including a band-like glass film taken up into a roll shape.

BACKGROUND ART

As is well known, thinning of glass sheets to be used in flat panel displays (FPD), such as a liquid crystal display, a plasma display, and an OLED display, glass sheets to be used in OLED illumination, glass sheets to be used for producing a tempered glass that is a component of a touch panel, and the like, and glass sheets to be used in panels of solar cells, and the like has been promoted in the current circumstances.

For example, in Patent Literature 1, there is disclosed a glass film (thin sheet glass) having a thickness of several hundred micrometers or less. As described also in this literature, this kind of glass film is generally obtained through continuous forming with a forming device employing a so-called overflow down-draw method.

For example, an elongated glass film obtained by the continuous forming by the overflow down-draw method is changed in its conveying direction from a vertical direction to a horizontal direction, and is then continuously conveyed to a downstream side with a lateral conveying unit (horizontal conveying unit) of a conveying device. In the process of the conveyance, both end portions (selvage portions) of the glass film in a width direction are cut and removed. After that, the glass film is taken up into a roll shape with a take-up roller. Thus, a glass roll is formed.

In Patent Literature 1, as a method of cutting both the end portions of the glass film in the width direction, laser cleaving is disclosed. The laser cleaving involves forming an initial crack on the glass film by crack forming means, such as a diamond cutter, and then irradiating the portion with a laser beam to heat the portion, followed by cooling the heated portion by cooling means to develop the initial crack through a thermal stress generated in the glass film, to thereby cut the glass film.

As another cutting method, in Patent Literature 2, there is disclosed a cutting technology for a glass film involving utilizing a so-called peeling phenomenon. The technology involves irradiating the glass film (glass substrate) with a laser beam to melt-cut part of the glass film while conveying the glass film, and moving the melt-cut portion away from a laser beam irradiation region to cool the portion.

In this case, when the melt-cut portion is cooled, a substantially thread-like peeled material is generated (for example, see paragraph 0067 and FIG. 8 of Patent Literature 2). A phenomenon in which the thread-like peeled material is peeled off from an end portion of the glass film is generally called peeling. When the thread-like peeled material is generated, a uniform cut surface is formed on the glass film.

CITATION LIST

Patent Literature 1: JP 2012-240883 A
Patent Literature 2: WO 2014/192482 A1

SUMMARY OF INVENTION

Technical Problem

Further, in Patent Literature 2, as a method of removing the thread-like peeled material, for example, blowing off by a gas, suction, and the use of a blush, a baffle plate, or the like are described (see paragraph 0073 of Patent Literature 2).

However, when the thread-like peeled material is removed by the above-mentioned means during cutting of the glass film, there is a risk in that the thread-like peeled material is broken in a middle thereof, and a fragment thereof adheres to the glass film to damage the surface of the glass film. Therefore, it is desired that the thread-like peeled material be continuously collected so that the thread-like peeled material is not broken in the middle thereof.

The present invention has been made in view of the above-mentioned circumstances, and an object of the present invention is to provide a method of producing a glass roll capable of collecting a thread-like peeled material without breaking the thread-like peeled material.

Solution to Problem

As a measure to achieve the above-mentioned object, according to one embodiment of the present invention, there is provided a method of producing a glass roll including a band-like glass film taken up into a roll shape, the method comprising: conveying step of conveying the glass film along a longitudinal direction thereof; a cutting step of irradiating the glass film with a laser beam from a laser irradiation apparatus while conveying the glass film by the conveying step, to thereby separate the glass film into a non-product portion and a product portion; and a take-up step of taking up the product portion into a roll shape, to thereby form a glass roll, the cutting step comprising winding a thread-like peeled material generated from an end portion of the product portion in a width direction around a rod-shaped collecting member, to thereby collect the thread-like peeled material.

In the cutting step, the thread-like peeled material can be continuously collected by being wound around the rod-shaped collecting member. With this, the thread-like peeled material is collected without being broken in a middle thereof, and a fragment thereof does not adhere to the product portion. Accordingly, by the method according to the embodiment of the present invention, the glass roll can be produced efficiently while the product portion is prevented from being damaged.

In the method of producing a glass roll according to the embodiment of the present invention, it is desired that the collecting member be arranged on a downstream side of an irradiation position of the glass film with the laser beam so that a tip end portion thereof is directed to an upstream side.

As already described, the thread-like peeled material is generated when the glass film is melt-cut with a laser beam, and the melt-cut portion is cooled by being moved away from a laser beam irradiation position to a downstream side. Therefore, when the collecting member is arranged on the downstream side of the irradiation position of the glass film with the laser beam so that the tip end portion thereof is directed to the upstream side, the thread-like peeled material can be suitably wound around the collecting member.

In the method of producing a glass roll according to the embodiment of the present invention, it is desired that the collecting member be arranged at a position above the glass film in such an inclined manner that a tip end portion thereof is directed downward. As described above, when the collecting member is arranged in such an inclined manner that the tip end portion thereof is directed downward, the thread-like peeled material can be suitably collected in the case in which the thread-like peeled material is generated below the collecting member and develops so as to extend upward.

In the method of producing a glass roll according to the embodiment of the present invention, it is desired that the collecting member be arranged so that at least a tip end portion thereof is above the non-product portion. As described above, when the collecting member is arranged so that at least the tip end portion thereof is above the non-product portion, the thread-like peeled material can be prevented from being brought into contact with the product portion while being collected, and the product portion can be prevented from being damaged.

In the method of producing a glass roll according to the embodiment of the present invention, it is desired that the collecting member be arranged so that a tip end portion thereof is directed to a position above an irradiation position of the glass film with the laser beam. When the thread-like peeled material develops so as to extend upward, the thread-like peeled material tends to be deformed into a helical shape in the middle thereof. According to the embodiment of the present invention, the tip end portion of the collecting member is directed to a position above the irradiation position of the glass film with the laser beam, and hence when the thread-like peeled material is deformed into a helical shape, the tip end portion can pass through a center of the helical shape. With this, the thread-like peeled material can be suitably collected without being broken.

In the method of producing a glass roll according to the embodiment of the present invention, it is desired that the cutting step further comprise blowing an air toward a tip end portion of the collecting member from an air nozzle. With this, while the thread-like peeled material is moved toward the collecting member, the thread-like peeled material having been collected from the tip end portion can be moved to a back side of the collecting member.

Advantageous Effects of Invention

According to the present invention, the thread-like peeled material can be collected without being broken.

DESCRIPTION OF EMBODIMENTS

Now, an embodiment of the present invention is described with reference to the drawings. In each of FIG. 1 to FIG. 5, an embodiment of a method of producing a glass roll according to the present invention is illustrated.

Figure 1:
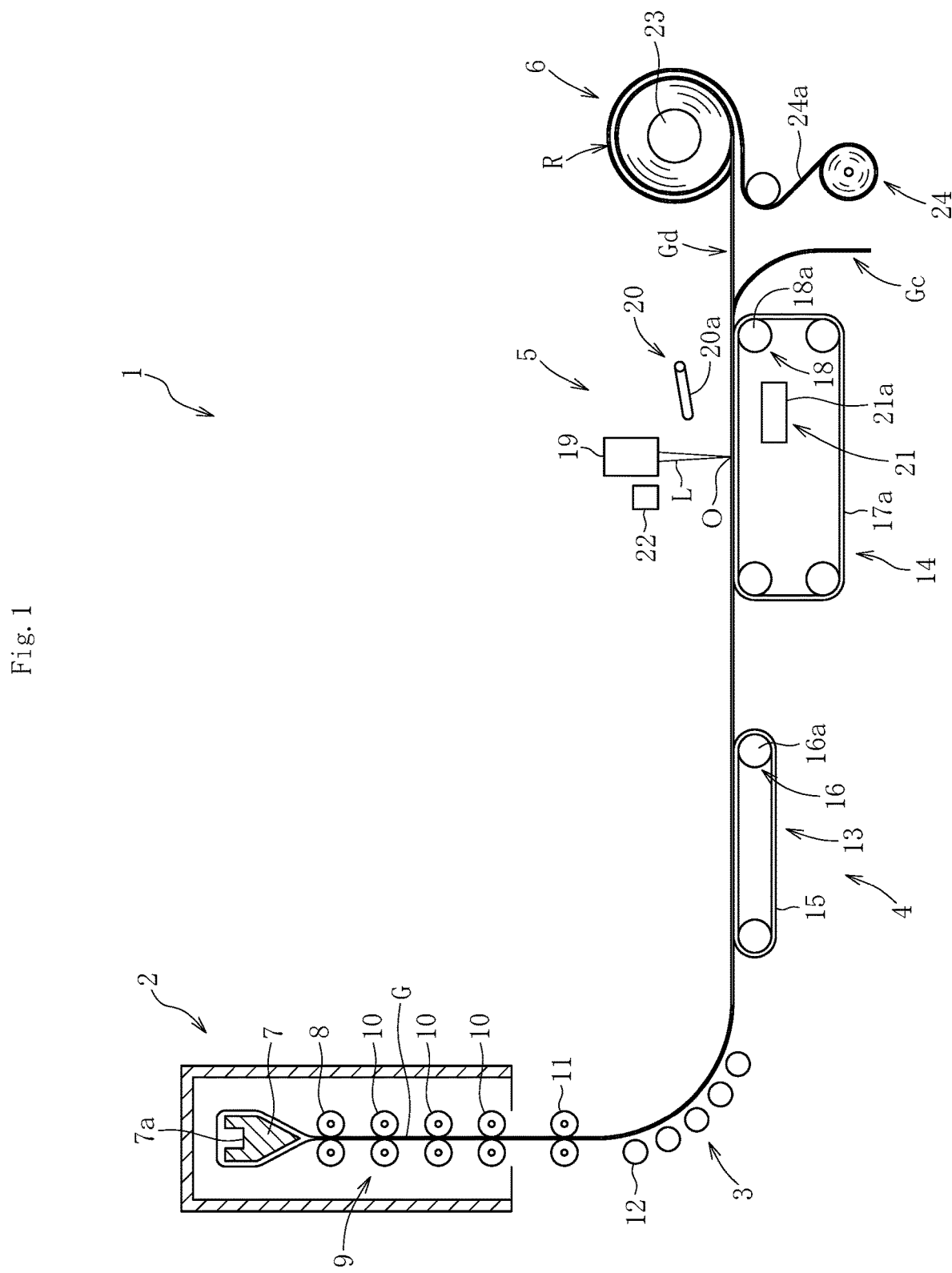
FIG. 1 is a side view for illustrating an overall configuration of an apparatus for producing a glass roll.

FIG. 1 is a schematic side view for schematically illustrating an overall configuration of an apparatus for producing a glass roll. As illustrated in FIG. 1, a production apparatus 1 comprises: a forming portion 2 configured to form a glass film G; a direction conversion portion 3 configured to convert a traveling direction of the glass film G from a vertically downward direction to a lateral direction; a lateral conveying portion 4 configured to convey the glass film G in the lateral direction after the direction conversion; a cutting portion 5 configured to cut end portions (selvage portions) Ga and Gb of the glass film G in a width direction as non-product portions Gc while the glass film G is conveyed in the lateral direction with the lateral conveying portion 4; and a take-up portion 6 configured to take up a product portion Gd into a roll shape to form a glass roll R, the product portion Gd being obtained by cutting and removing the non-product portions Gc with the cutting portion 5. In this embodiment, the thickness of the product portion Gd is set to 300 μm or less, preferably 100 μm or less.

The forming portion 2 comprises: a forming body 7 having a substantially wedge shape in a sectional view in which an overflow groove 7a is formed on an upper end portion thereof; cooling rollers 8 arranged immediately below the forming body 7 and configured to sandwich molten glass overflowing from the forming body 7 from both front and back surface sides of the molten glass; and an annealer 9 arranged immediately below the cooling rollers 8.

The forming portion 2 is configured to cause the molten glass overflowing from an upper portion of the overflow groove 7a of the forming body 7 to flow down along both side surfaces of the forming body 7 to be joined at a lower end of the forming body 7, to thereby form a molten glass in a film shape. The cooling rollers 8 are configured to control shrinkage of the molten glass in a width direction to form the glass film G having a predetermined width. The annealer 9 is configured to perform strain removal treatment on the glass film G. The annealer 9 comprises annealer rollers 10 arranged in a plurality of stages in a vertical direction.

Support rollers 11 configured to sandwich the glass film G from both the front and back surface sides are arranged below the annealer 9. A tension for encouraging thinning of the glass film G is applied between the support rollers 11 and the cooling rollers 8 or between the support rollers 11 and the annealer rollers 10 at any one position.

The direction conversion portion 3 is arranged at a position below the support rollers 11. In the direction conversion portion 3, a plurality of guide rollers 12 configured to guide the glass film G are arranged in a curved form. Those guide rollers 12 are configured to guide the glass film G, which has been conveyed in the vertical direction, in the lateral direction.

The lateral conveying portion 4 is arranged in a forward traveling direction with respect to (on a downstream side of) the direction conversion portion 3. The lateral conveying portion 4 comprises: a first conveying device 13; and a second conveying device 14. The first conveying device 13 is arranged on a downstream side of the direction conversion portion 3, and the second conveying device 14 is arranged on a downstream side of the first conveying device 13.

The first conveying device 13 comprises: an endless belt-like conveyor belt 15; and a driver 16 for the conveyor belt 15. The first conveying device 13 is configured to continuously convey the glass film G having passed through the direction conversion portion 3 to a downstream side by bringing an upper surface of the conveyor belt 15 into contact with the glass film G. The driver 16 comprises: a driving body 16a for driving the conveyor belt 15, such as a roller or a sprocket; and a motor (not shown) configured to rotate the driving body 16a.

Figure 2:
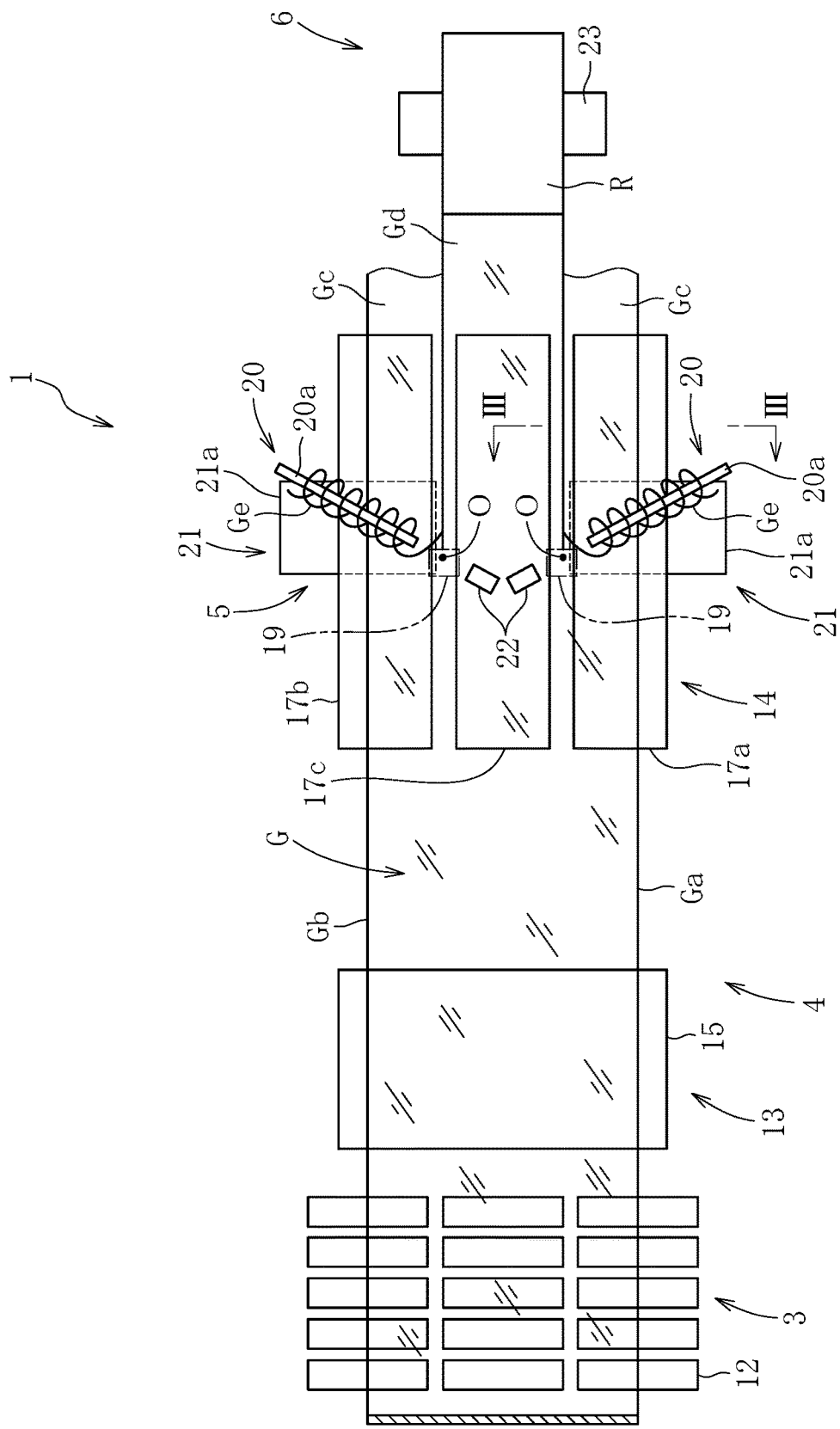
FIG. 2 is a plan view for illustrating a main portion of the apparatus for producing a glass roll.

The second conveying device 14 comprises: a plurality of (in this example, three) conveyor belts 17a to 17c each configured to convey the glass film G; and a driver 18 for the conveyor belts 17a to 17c. As illustrated in FIG. 2, the conveyor belts 17a to 17c include: the first conveyor belt 17a to be brought into contact with the one end portion Ga of the glass film G in the width direction; the second conveyor belt 17b to be brought into contact with the other end portion Gb of the glass film G in the width direction; and the third conveyor belt 17c to be brought into contact with a middle portion of the glass film G in the width direction. The driver 18 comprises: a driving body 18a for driving the conveyor belts 17a to 17c, such as a roller or a sprocket; and a motor (not shown) configured to rotate the driving body 18a.

As illustrated in FIG. 2, the conveyor belts 17a to 17c are arranged so as to be spaced apart from one another in the width direction of the glass film G. With this, gaps are formed between the first conveyor belt 17a and the third conveyor belt 17c and between the second conveyor belt 17b and the third conveyor belt 17c.

Figure 3:
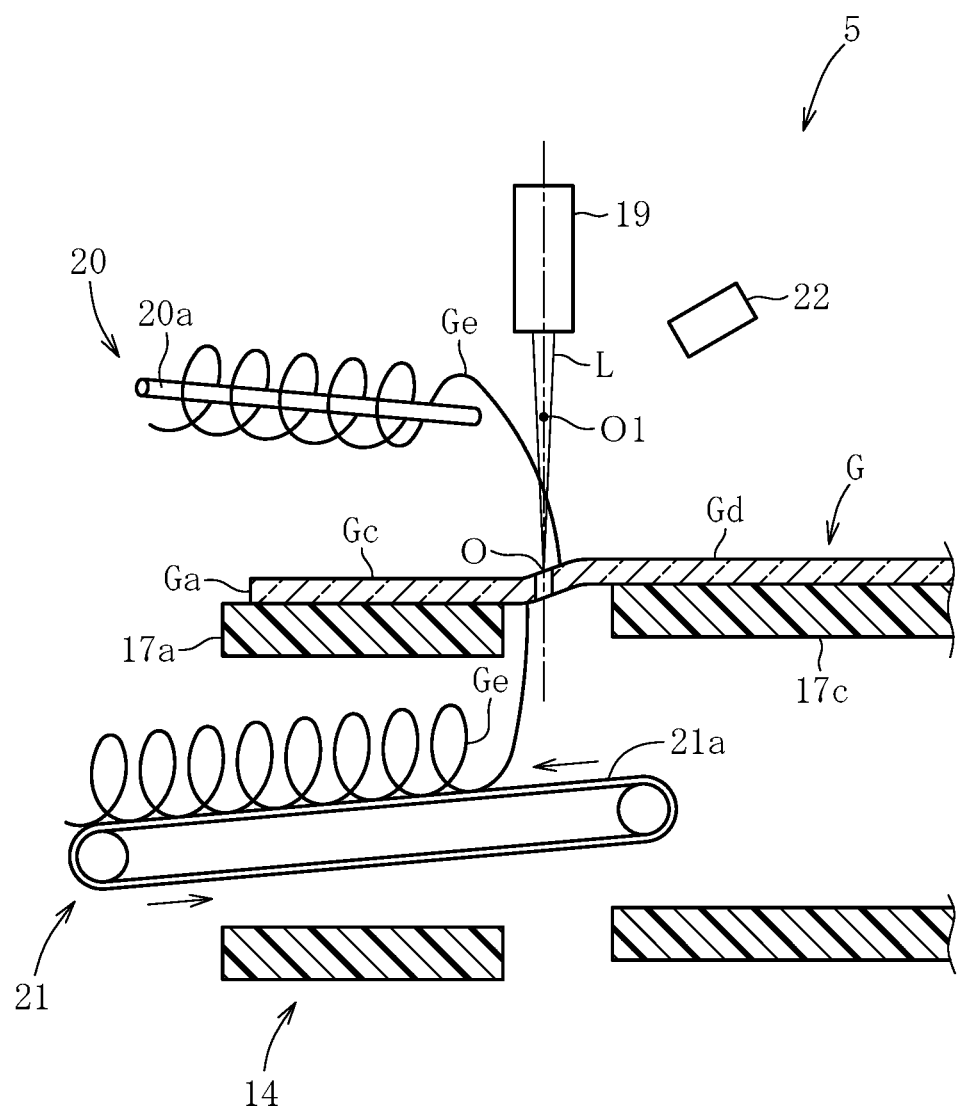
FIG. 3 is a sectional view taken along the line III-III of FIG. 2.

As illustrated in FIG. 3, the third conveyor belt 17c is configured to support the glass film G so that an upper portion of the third conveyor belt 17c is located at a higher level than an upper portion of the first conveyor belt 17a. While the illustration is omitted, the upper portion of the first conveyor belt 17a and an upper portion of the second conveyor belt 17b are set to the same height. As described above, a difference in height is made between the upper portion of the third conveyor belt 17c and each of the upper portion of the first conveyor belt 17a and the upper portion of the second conveyor belt 17b, and hence the glass film G to be conveyed is conveyed with the conveyor belts 17a to 17c under a state in which the middle portion thereof in the width direction is deformed so as to protrude upward with respect to each of the end portions Ga and Gb in the width direction. In addition, when the glass film G is cut with the cutting portion 5, the product portion Gd is conveyed with the third conveyor belt 17c at a position higher than those of the non-product portions Gc.

As illustrated in FIG. 1 to FIG. 3, the cutting portion 5 comprises: a laser irradiation apparatus 19 arranged at a portion above the second conveying device 14; a plurality of collecting devices 20 and 21 each configured to collect a thread-like peeled material Ge generated when the glass film G is irradiated with a laser beam L from the laser irradiation apparatus 19; and an air nozzle 22 configured to blow an air toward some of the devices, that is, the collecting device 21.

The laser irradiation apparatus 19 has a configuration in which the laser beam L, such as a $CO_2$ laser, a YAG laser, or any other laser, is radiated downward. The laser beam L is radiated to a predetermined position (irradiation position) O of the glass film G. In this embodiment, two laser irradiation apparatus 19 are arranged so that both the end portions Ga and Gb of the glass film G in the width direction are cut (see FIG. 2). As illustrated in FIG. 2, the irradiation positions O with the laser beam L are set so as to correspond to the gap between the first conveyor belt 17a and the third conveyor belt 17c and the gap between the second conveyor belt 17b and the third conveyor belt 17c in the second conveying device 14.

As illustrated in FIG. 2 and FIG. 3, the collecting devices 20 and 21 include: a first collecting device 20 arranged above the glass film G; and a second collecting device 21 arranged below the glass film G. The first collecting device 20 is configured to collect a thread-like peeled material Ge generated from the product portion Gd, and the second collecting device 21 is configured to collect a thread-like peeled material Ge generated from the non-product portion Gc. In this embodiment, two first collecting devices 20 and two second collecting devices 21 are arranged at predetermined positions.

Figure 4A:
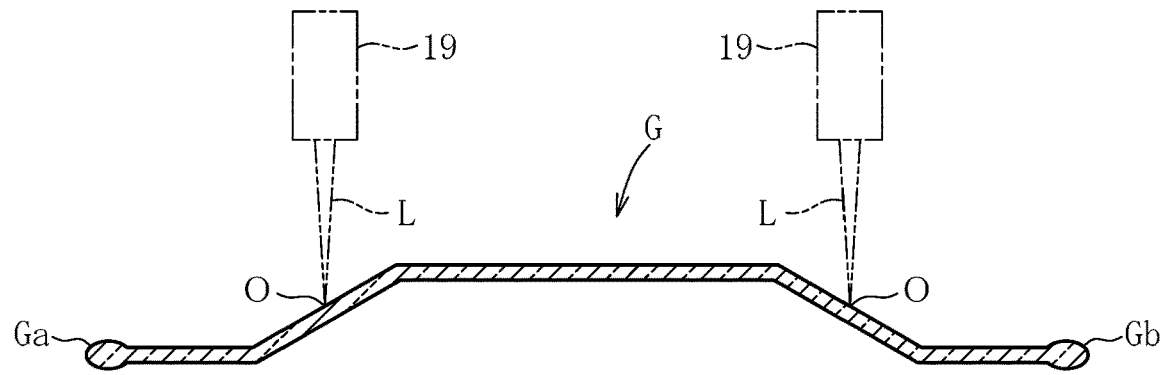
FIG. 4A is a view for illustrating a mechanism for the generation of a thread-like peeled material, and is a sectional view for illustrating a state in which a glass film is irradiated with a laser beam.
Figure 4B:
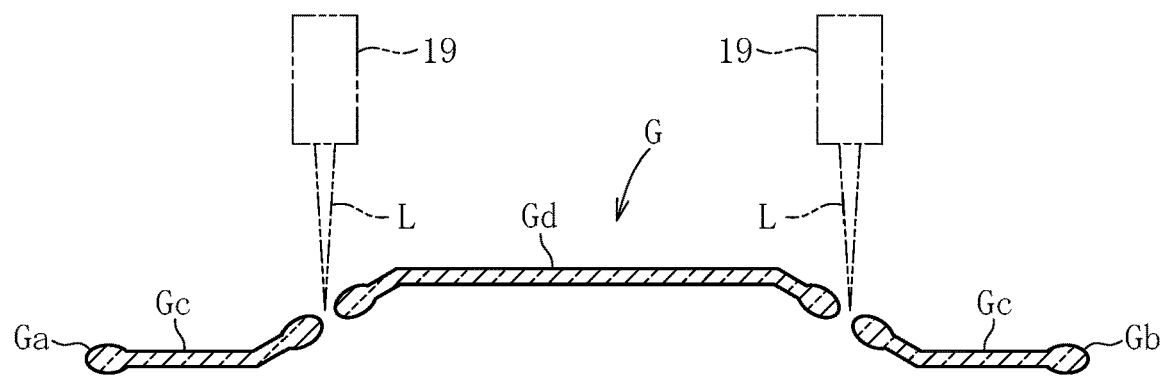
FIG. 4B is a view for illustrating the mechanism for the generation of the thread-like peeled material, and is a sectional view for illustrating a state in which the glass film is melt-cut through irradiation with the laser beam.

Here, a mechanism for the generation of the thread-like peeled material Ge is described with reference to FIG. 4. When the glass film G is irradiated with the laser beam L as illustrated in FIG. 4A, part of the glass film G is melt-cut by being heated with the laser beam L as illustrated in FIG. 4B. The glass film G is conveyed with the second conveying device 14, and hence the melt-cut portion is moved away from the laser beam L.

Figure 4C:
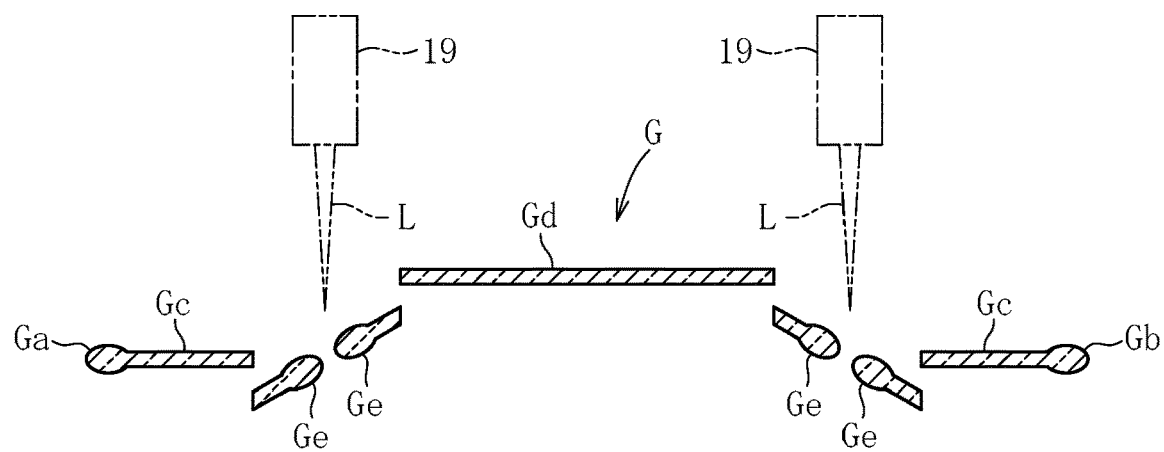
FIG. 4C is a view for illustrating the mechanism for the generation of the thread-like peeled material, and is a sectional view for illustrating a state in which the thread-like peeled material is generated from each of a product portion and a non-product portion.

With this, the melt-cut portion of the glass film G is cooled. Through the cooling, a heat strain occurs in the melt-cut portion, and a stress resulting therefrom acts as a tensile force in a portion not having been melt-cut. By the action, as illustrated in FIG. 4C, the thread-like peeled material Ge is separated from each of an end portion of the non-product portion Gc in a width direction and an end portion of the product portion Gd in a width direction.

As already described, the vertical position of the third conveyor belt 17c configured to convey the product portion Gd is set to be higher than the vertical positions of the first conveyor belt 17a and the second conveyor belt 17b configured to convey the non-product portions Gc. With such positional relationship, the thread-like peeled material Ge generated from the non-product portion Gc is encouraged to move below the product portion Gd (see FIG. 4C). Meanwhile, the thread-like peeled material Ge generated from the product portion Gd is deformed so as to extend upward because there is no obstacle.

The first collecting device 20 comprises a rod-shaped collecting member 20a. The collecting member 20a is formed of a metal. However, the material for the collecting member 20a is not limited thereto, and the collecting member 20a may be formed of a resin or any other material. As illustrated in FIG. 2, the collecting member 20a is arranged on a downstream side of the laser irradiation apparatus 19.

The collecting member 20a is arranged in such an inclined manner that a tip end portion thereof is directed to an upstream side of a conveying direction of the glass film G in a plan view. The collecting member 20a is inclined at preferably from about 10° to about 60°, more preferably from about 20° to about 40° with respect to a direction perpendicular to the conveying direction of the glass film G (the width direction of the glass film G), but the inclination angle is not limited thereto. As described above, when the collecting member 20a, which is arranged on the downstream side of the laser irradiation apparatus 19, is arranged so that the tip end portion thereof is directed to the upstream side, the thread-like peeled material Ge generated from the product portion Gd can be suitably collected on a downstream side of the irradiation position O with the laser beam L.

As illustrated in FIG. 2, the collecting member 20a is arranged so that at least part thereof, for example, the tip end portion overlaps the non-product portion Gc. In other words, the tip end portion of the collecting member 20a does not overlap the product portion Gd in a plan view. When the collecting member 20a is arranged in such a manner, the thread-like peeled material Ge wound around the collecting member 20a is prevented from being brought into contact with the product portion Gd, and the product portion Gd can be prevented from being damaged.

As illustrated in FIG. 3, the collecting member 20a is arranged in such an inclined manner that the tip end portion thereof is directed downward in a side view. In this embodiment, the collecting member 20a is inclined at about 5° with respect to a horizontal direction, but the inclination angle is not limited thereto. When the collecting member 20a is arranged in such an inclined manner, the tip end portion of the collecting member 20a is directed to the thread-like peeled material Ge extending upward from below. Accordingly, the thread-like peeled material Ge generated from the product portion Gd can be suitably wound around the collecting member 20a.

In addition, as illustrated in FIG. 3, the collecting member 20a is arranged so that the tip end portion thereof is directed to a position O1 above the irradiation position O of the glass film G with the laser beam L. The position O1 is positioned on a vertical line (line represented by the long dashed short dashed line) passing through the irradiation position O with the laser beam L.

The thread-like peeled material Ge extends upward to some extent, and is then deformed into a helical shape. Accordingly, when the tip end portion of the collecting member 20a is directed to the position O1 above the irradiation position O with the laser beam L, in the case in which the thread-like peeled material Ge is deformed into a helical shape, the tip end portion of the collecting member 20a can be directed to a substantially center position of the helical shape. With this, the tip end portion of the collecting member 20a can be inserted into a center of the thread-like peeled material Ge having a helical shape, and the thread-like peeled material Ge can be reliably collected.

As illustrated in FIG. 2 and FIG. 3, the second collecting device 21 is formed of a belt conveyor 21a. In this embodiment, two belt conveyors 21a corresponding to the end portions Ga and Gb of the glass film G are arranged. As illustrated in FIG. 3, each of the belt conveyors 21a is arranged so that the belt conveyor is inclined downward from an inward side of the glass film G in the width direction to an outward side of the glass film G in the width direction. Each of the belt conveyors 21a is configured to convey the thread-like peeled material Ge in a direction perpendicular to the conveying direction (longitudinal direction) of the glass film G (in the width direction), that is, from the inward side to the outward side of the glass film G in the width direction.

As illustrated in FIG. 1, the air nozzle 22 is arranged above the second conveying device 14. The air nozzle 22 is arranged so as to face the collecting member 20a of the first collecting device 20, and is configured to blow an air toward the tip end portion of the collecting member 20a. In addition, the air nozzle 22 may also be configured to blow an air toward the melt-cut portion formed on the irradiation position O of the glass film G with the laser beam L on the second conveying device 14.

When an air is blown toward the tip end portion of the collecting member 20a from the air nozzle 22, the thread-like peeled material Ge generated from the melt-cut portion of the glass film G can be moved toward the collecting member 20a, and the thread-like peeled material Ge wound around the collecting member 20a can be moved to a back side of the collecting member 20a.

The take-up portion 6 is arranged on a downstream side of the cutting portion 5 and the second conveying device 14. The take-up portion 6 comprises: a take-up roller 23; a motor (not shown) configured to rotationally drive the take-up roller 23; and a protective sheet supply portion 24 configured to supply a protective sheet 24a to the take-up roller 23. The take-up portion 6 is configured to take up the product portion Gd into a roll shape by rotating the take-up roller 23 with the motor while causing the protective sheet 24a supplied from the protective sheet supply portion 24 to overlap the product portion Gd. The product portion Gd having been taken up forms the glass roll R.

A method of producing the glass roll R with the production apparatus 1 having the above-mentioned configuration is described below. The method of producing the glass roll R comprises: a forming step of forming the band-like glass film G with the forming portion 2; a conveying step of conveying the glass film G with the direction conversion portion 3 and the lateral conveying portion 4; a cutting step of cutting the end portions Ga and Gb of the glass film G in the width direction with the cutting portion 5; and a take-up step of taking up the product portion Gd with the take-up portion 6 after the cutting step.

In the forming step, molten glass overflowing from an upper portion of the overflow groove 7a of the forming body 7 in the forming portion 2 is caused to flow down along both side surfaces of the forming body 7 to be joined at a lower end of the forming body 7, to thereby form a molten glass in a film shape. At this time, the shrinkage of the molten glass in a width direction is controlled with the cooling rollers 8, and thus the glass film G having a predetermined width is formed. After that, strain removal treatment is performed on the glass film G with the annealer 9. The glass film G having a predetermined thickness is formed through a tension applied by the support rollers 11.

In the conveying step, the conveying direction of the glass film G is converted to a lateral direction with the direction conversion portion 3, and the glass film G is conveyed to the take-up portion 6 on a downstream side with the conveying devices 13 and 14.

In the cutting step, while the glass film G is conveyed with the second conveying device 14, the glass film G is irradiated with the laser beam L from the laser irradiation apparatus 19 of the cutting portion 5, and both the end portions Ga and Gb of the glass film G in the width direction are cut. With this, the glass film G is separated into the non-product portions Gc and the product portion Gd. In addition, in the cutting step, the thread-like peeled materials Ge generated from the non-product portions Gc and the product portion Gd are collected with the first collecting device 20 and the second collecting device 21 (collecting step).

As illustrated in FIG. 3, while the thread-like peeled material Ge generated from the product portion Gd extends upward, the thread-like peeled material Ge is deformed into a helical shape in a middle thereof. The tip end portion of the collecting member 20a is inserted into a substantial center of the helical shape in accordance with the deformation of the thread-like peeled material Ge. The thread-like peeled material Ge moves so as to be wound around the collecting member 20a while being deformed into a helical shape.

During the movement, part of the thread-like peeled material Ge is brought into contact with the collecting member 20a in some cases. The collecting member 20a is configured to guide the thread-like peeled material Ge to a back side thereof while the collecting member 20a is brought into contact with the part of the thread-like peeled material Ge.

The non-product portions Gc are conveyed to a downstream side with the first conveyor belt 17a and the second conveyor belt 17b of the second conveying device 14, and collected on an upstream side of the take-up portion 6 with another collecting device not shown in the figures.

In the take-up step, the product portion Gd having been conveyed with the second conveying device 14 is taken up into a roll shape with the take-up roller 23 of the take-up portion 6 while the protective sheet 24a is supplied to the product portion Gd from the protective sheet supply portion 24. When the product portion Gd having a predetermined length is taken up with the take-up roller 23, the glass roll R is completed.

By the method of producing the glass roll R according to this embodiment described above, in the cutting step, the thread-like peeled material Ge generated on a product portion Gd side can be continuously collected by being wound around the collecting member 20a of the first collecting device 20. In addition, the thread-like peeled material Ge generated on a non-product portion Gc side is collected with the belt conveyor 21a of the second collecting device 21. With this, each of the thread-like peeled materials Ge is collected without being broken in the middle thereof, and a fragment thereof does not adhere to the glass film G. Accordingly, the glass roll R can be produced efficiently while the glass film G is prevented from being damaged.

The inventors of the present invention performed a test for measuring a collection capability of the rod-shaped collecting member 20a of the first collecting device 20. As Reference Example, a resin sheet was prepared, and the thread-like peeled material Ge was collected by being placed on the resin sheet. As compared to Reference Example, the rod-shaped collecting member 20a was able to collect a larger amount of the thread-like peeled material Ge without breaking the thread-like peeled material Ge in the middle thereof.

The present invention is not limited to the configurations of the above-mentioned embodiments. In addition, the action and effect of the present invention are not limited to those described above. The present invention may be modified in various forms within the range not departing from the spirit of the present invention.

In the above-mentioned embodiment, while the first collecting device 20 is formed of the rod-shaped collecting member 20a and the second collecting device 21 is formed of the belt conveyor 21a, the configuration is not limited thereto. For example, it is appropriate that both the collecting devices 20 and 21 be formed of rod-shaped collecting members or belt conveyors. In addition, it is also appropriate that the first collecting device 20 be formed of a belt conveyor and the second collecting device 21 be formed of a rod-shaped collecting member. When the second collecting device 21 is formed of the rod-shaped collecting member, it is desired that the rod-shaped collecting member be arranged in such an inclined manner that a tip end portion thereof is directed to an upstream side and toward the glass film G arranged above the collecting member.

In addition, the thread-like peeled material Ge generated from the non-product portion Gc moves below the product portion Gd, and hence, depending on the length of the product portion Gd to be taken up, the thread-like peeled material Ge may not be brought into contact with a product surface of the product portion Gd and may cause no trouble. In this case, it is appropriate to omit the second collecting device 21, and collect only the thread-like peeled material Ge generated from the product portion Gd only with the first collecting device 20.

Figure 5A:
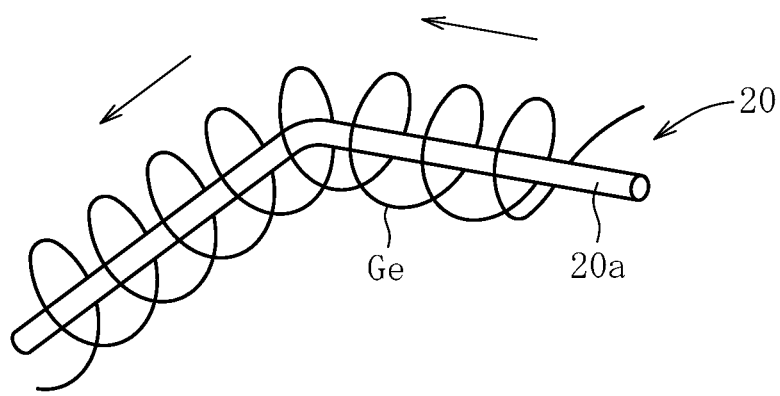
FIG. 5A is a perspective view for illustrating another example of a collecting member.

In the above-mentioned embodiment, while the collecting member 20a of the first collecting device 20 is formed of a linear rod-shaped member, the configuration is not limited thereto. For example, as illustrated in FIG. 5A, the collecting member 20a may be formed of a curved rod-shaped member. Such collecting member 20a is desirably arranged so that end portions are each directed downward. While the thread-like peeled material Ge is introduced from one end portion of such collecting member 20a and collected by moving to another end portion side of the collecting member 20a, the collecting member 20a is formed into a curved shape, and hence the thread-like peeled material Ge is guided downward in accordance with the curved shape on the way to moving to another end portion of the collecting member 20a.

At this time, the thread-like peeled material Ge also moves downward under its own weight. With this, the collection speed of the thread-like peeled material Ge can be increased. In addition, when the collecting member 20a is formed into a curved shape, the collecting member 20a does not occupy a large arrangement space in a horizontal direction as compared to a linear one, and hence its length dimension can be ensured to be as long as possible.

Figure 5B:
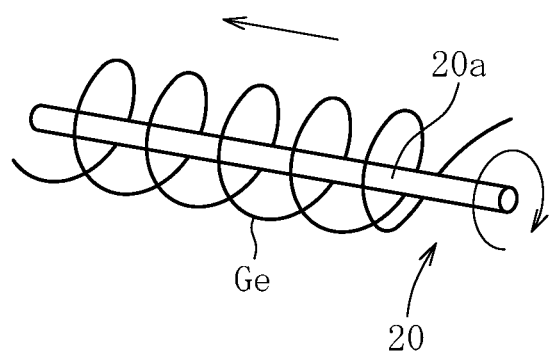
FIG. 5B is a perspective view for illustrating still another example of the collecting member.

Besides, as illustrated in FIG. 5B, the thread-like peeled material Ge may be collected by rotating the rod-shaped collecting member 20a about its axial center.

REFERENCE SIGNS LIST 19 laser irradiation apparatus
20a collecting member
G glass film
Ga end portion of glass film
Gb end portion of glass film
Gc non-product portion
Gd product portion
Ge thread-like peeled material
L laser beam
R glass roll

The invention claimed is:
1. A method of producing a glass roll including a band-shaped glass film taken up into a roll shape, the method comprising:
   a conveying step of conveying the glass film along a longitudinal direction thereof;
   a cutting step of irradiating the glass film with a laser beam from a laser irradiation apparatus while conveying the glass film by the conveying step, to thereby separate the glass film into a non-product portion and a product portion; and
   a take-up step of taking up the product portion into a roll shape, to thereby form a glass roll,
   wherein the cutting step comprises:
      generating a thread-shaped peeled material from an end portion of the product portion in a width direction;
      winding the thread-shaped peeled material around a rod-shaped collecting member, to thereby collect the thread-shaped peeled material; and
      collecting the non-product portion, and
   wherein the rod-shaped collecting member is arranged at a position above the glass film.

2. The method of producing a glass roll according to claim 1, wherein the rod-shaped collecting member is arranged on a downstream side of an irradiation position of the glass film with the laser beam so that a tip end portion of the rod-shaped collecting member is directed to an upstream side.

3. The method of producing a glass roll according to claim 1, wherein the rod-shaped collecting member is arranged in such an inclined manner that a tip end portion of the rod-shaped collecting member is directed downward.

4. The method of producing a glass roll according to claim 1, wherein the rod-shaped collecting member is arranged so that at least a tip end portion of the rod-shaped collecting member is above the non-product portion.

5. The method of producing a glass roll according to claim 1, wherein the rod-shaped collecting member is arranged so that a tip end portion of the rod-shaped collecting member is directed to a position above an irradiation position of the glass film with the laser beam.

6. The method of producing a glass roll according to claim 1, wherein the cutting step further comprises blowing air toward a tip end portion of the rod-shaped collecting member from an air nozzle.

7. A method of producing a glass roll including a band-shaped glass film taken up into a roll shape, the method comprising:
- a conveying step of conveying the glass film along a longitudinal direction thereof;
- a cutting step of irradiating the glass film with a laser beam from a laser irradiation apparatus while conveying the glass film by the conveying step, to thereby separate the glass film into a non-product portion and a product portion; and
- a take-up step of taking up the product portion into a roll shape, to thereby form a glass roll,
- wherein the cutting step comprises winding a thread-shaped peeled material generated from an end portion of the product portion in a width direction around a rod-shaped collecting member, to thereby collect the thread-shaped peeled material, and
- wherein the rod-shaped collecting member is arranged on a downstream side of an irradiation position of the glass film with the laser beam so that a tip end portion of the rod-shaped collecting member is directed to an upstream side.

8. The method of producing a glass roll according to claim 7, wherein the rod-shaped collecting member is arranged at a position above the glass film in such an inclined manner that a tip end portion of the rod-shaped collecting member is directed downward.

9. The method of producing a glass roll according to claim 7, wherein the rod-shaped collecting member is arranged so that at least a tip end portion of the rod-shaped collecting member is above the non-product portion.

10. The method of producing a glass roll according to claim 7, wherein the rod-shaped collecting member is arranged so that a tip end portion of the rod-shaped collecting member is directed to a position above an irradiation position of the glass film with the laser beam.

11. The method of producing a glass roll according to claim 7, wherein the cutting step further comprises blowing air toward a tip end portion of the rod-shaped collecting member from an air nozzle.

12. A method of producing a glass roll including a band-shaped glass film taken up into a roll shape, the method comprising:
- a conveying step of conveying the glass film along a longitudinal direction thereof;
- a cutting step of irradiating the glass film with a laser beam from a laser irradiation apparatus while conveying the glass film by the conveying step, to thereby separate the glass film into a non-product portion and a product portion; and
- a take-up step of taking up the product portion into a roll shape, to thereby form a glass roll,
- wherein the cutting step comprises winding a thread-shaped peeled material generated from an end portion of the product portion in a width direction around a rod-shaped collecting member, to thereby collect the thread-shaped peeled material, and
- wherein the rod-shaped collecting member is arranged at a position above the glass film in such an inclined manner that a tip end portion of the rod-shaped collecting member is directed downward.

13. The method of producing a glass roll according to claim 12, wherein the rod-shaped collecting member is arranged so that at least a tip end portion of the rod-shaped collecting member is above the non-product portion.

14. The method of producing a glass roll according to claim 12, wherein the rod-shaped collecting member is arranged so that a tip end portion of the rod-shaped collecting member is directed to a position above an irradiation position of the glass film with the laser beam.

15. The method of producing a glass roll according to claim 12, wherein the cutting step further comprises blowing air toward a tip end portion of the rod-shaped collecting member from an air nozzle.

16. A method of producing a glass roll including a band-shaped glass film taken up into a roll shape, the method comprising:
- a conveying step of conveying the glass film along a longitudinal direction thereof;
- a cutting step of irradiating the glass film with a laser beam from a laser irradiation apparatus while conveying the glass film by the conveying step, to thereby separate the glass film into a non-product portion and a product portion; and
- a take-up step of taking up the product portion into a roll shape, to thereby form a glass roll,
- wherein the cutting step comprises winding a thread-shaped peeled material generated from an end portion of the product portion in a width direction around a rod-shaped collecting member, to thereby collect the thread-shaped peeled material, and
- wherein the rod-shaped collecting member is arranged so that at least a tip end portion of the rod-shaped collecting member is above the non-product portion.

17. The method of producing a glass roll according to claim 16, wherein the rod-shaped collecting member is arranged so that a tip end portion of the rod-shaped collecting member is directed to a position above an irradiation position of the glass film with the laser beam.

18. The method of producing a glass roll according to claim 16, wherein the cutting step further comprises blowing air toward a tip end portion of the rod-shaped collecting member from an air nozzle.

19. A method of producing a glass roll including a band-shaped glass film taken up into a roll shape, the method comprising:
- a conveying step of conveying the glass film along a longitudinal direction thereof;
- a cutting step of irradiating the glass film with a laser beam from a laser irradiation apparatus while conveying the glass film by the conveying step, to thereby separate the glass film into a non-product portion and a product portion; and a take-up step of taking up the product portion into a roll shape, to thereby form a glass roll, wherein the cutting step comprises winding a thread-shaped peeled material generated from an end portion of the product portion in a width direction around a rod-shaped collecting member, to thereby collect the thread-shaped peeled material, and wherein the rod-shaped collecting member is arranged so that a tip end portion of the rod-shaped collecting member is directed to a position above an irradiation position of the glass film with the laser beam.

20. The method of producing a glass roll including a band-shaped glass film taken up into a roll shape, the method comprising:

a conveying step of conveying the glass film along a longitudinal direction thereof;

a cutting step of irradiating the glass film with a laser beam from a laser irradiation apparatus while conveying the glass film by the conveying step, to thereby separate the glass film into a non-product portion and a product portion; and a take-up step of taking up the product portion into a roll shape, to thereby form a glass roll, wherein the cutting step comprises winding a thread-shaped peeled material generated from an end portion of the product portion in a width direction around a rod-shaped collecting member, to thereby collect the thread-shaped peeled material, and blowing air toward a tip end portion of the rod-shaped collecting member from an air nozzle.

* * * * *